United States Patent
Gu

(10) Patent No.: US 9,703,360 B2
(45) Date of Patent: Jul. 11, 2017

(54) ELECTRONIC DEVICE AND METHOD FOR CHANGING A WORKING STATE OF THE ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Peng Gu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 130 days.

(21) Appl. No.: 14/718,855

(22) Filed: May 21, 2015

(65) Prior Publication Data
US 2016/0170471 A1   Jun. 16, 2016

(30) Foreign Application Priority Data

Dec. 11, 2014   (CN) .......................... 2014 1 0765228

(51) Int. Cl.
| G06F 1/32 | (2006.01) |
| G06F 3/0489 | (2013.01) |
| G06F 3/02 | (2006.01) |
| G06F 3/038 | (2013.01) |
| H01H 13/00 | (2006.01) |
| H04M 1/725 | (2006.01) |

(52) U.S. Cl.
CPC .......... *G06F 1/3265* (2013.01); *G06F 1/3206* (2013.01); *G06F 3/0202* (2013.01); *G06F 3/038* (2013.01); *G06F 3/0489* (2013.01); *H01H 13/00* (2013.01); *H04M 1/72569* (2013.01)

(58) Field of Classification Search
CPC .... G06F 1/3265; G06F 3/0489; G06F 3/0202; G06F 3/038; G06F 1/3206; H04M 1/72569; H01H 13/00
See application file for complete search history.

(56) References Cited

U.S. PATENT DOCUMENTS

| 2007/0299322 | A1* | 12/2007 | Miyajima | ............ A61B 5/0008 600/301 |
| 2014/0112371 | A1* | 4/2014 | Yang | ........................ G01K 7/00 374/163 |
| 2014/0380032 | A1* | 12/2014 | Takahashi | ................. G06F 1/26 713/2 |
| 2015/0007232 | A1* | 1/2015 | Martch | .................. G08C 17/02 725/44 |

* cited by examiner

*Primary Examiner* — Premal Patel
(74) *Attorney, Agent, or Firm* — Steven Reiss

(57) ABSTRACT

A method for toggling between different working states of an electronic device includes detecting temperature and pressure data from at least one sensor when a home button of the electronic device is pressed, and recording a duration of the pressing when the sensed data is within predetermined values. A current state of the electronic device and/or display screen is detected, and a working state is changed from the prevailing state to an opposite state, in dependence on the recorded duration of the pressing.

17 Claims, 4 Drawing Sheets

ELECTRONIC DEVICE AND METHOD FOR CHANGING A WORKING STATE OF THE ELECTRONIC DEVICE

CROSS-REFERENCE TO RELATED APPLICATIONS

This application claims priority to Chinese Patent Application No. 201410765228.X filed on Dec. 11, 2014, the contents of which are incorporated by reference herein.

FIELD

The subject matter herein generally relates to control technology.

BACKGROUND

An electronic device (e.g., a mobile phone or personal digital assistant) can be equipped with a physical button which, when pressed, turns on and/or turns off the electronic device. The working life of a full power, resiliently-supported, physical button is not long.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
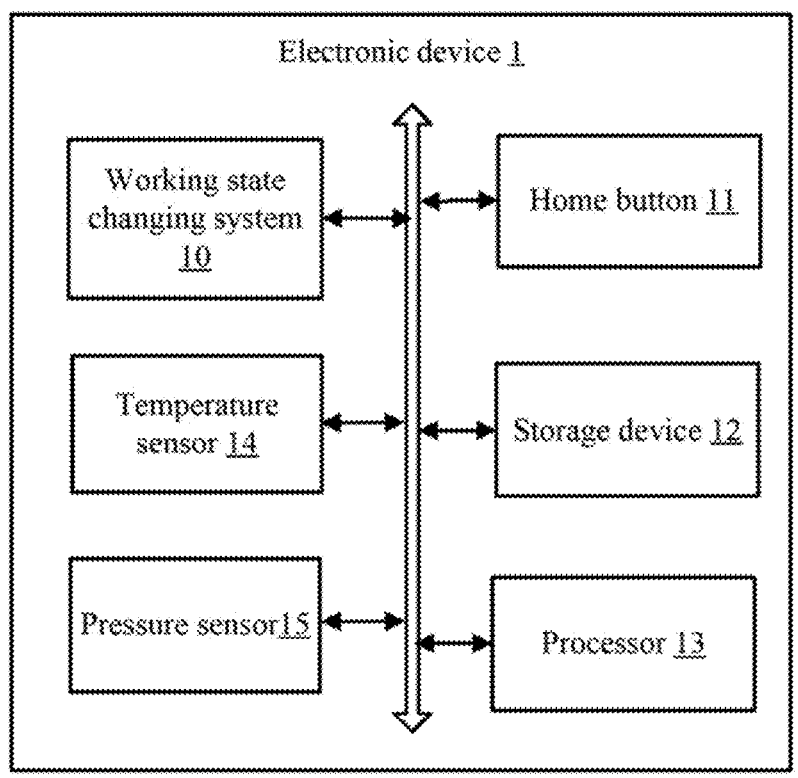
FIG. 1 is a block diagram of an example embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. The term "comprising," when utilized, means "including, but not necessarily limited to", it specifically indicates open-ended inclusion or membership in the so-described combination, group, series and the like. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 is a block diagram of an example embodiment of an electronic device. In at least one embodiment, an electronic device 1 includes a working state changing system 10. The electronic device 1 further includes, but is not limited to, a home button 11, a storage device 12, at least one processor 13, and at least one sensor, such as a temperature sensor 14 and a pressure sensor 15. In at least one embodiment, the electronic device 1 can be a smart phone, a personal digital assistant (PDA), a tablet computer, or other electronic device. FIG. 1 illustrates only one example of the electronic device, other examples can include more or fewer components than as illustrated, or have a different configuration of the various components in other embodiments.

Figure 2:
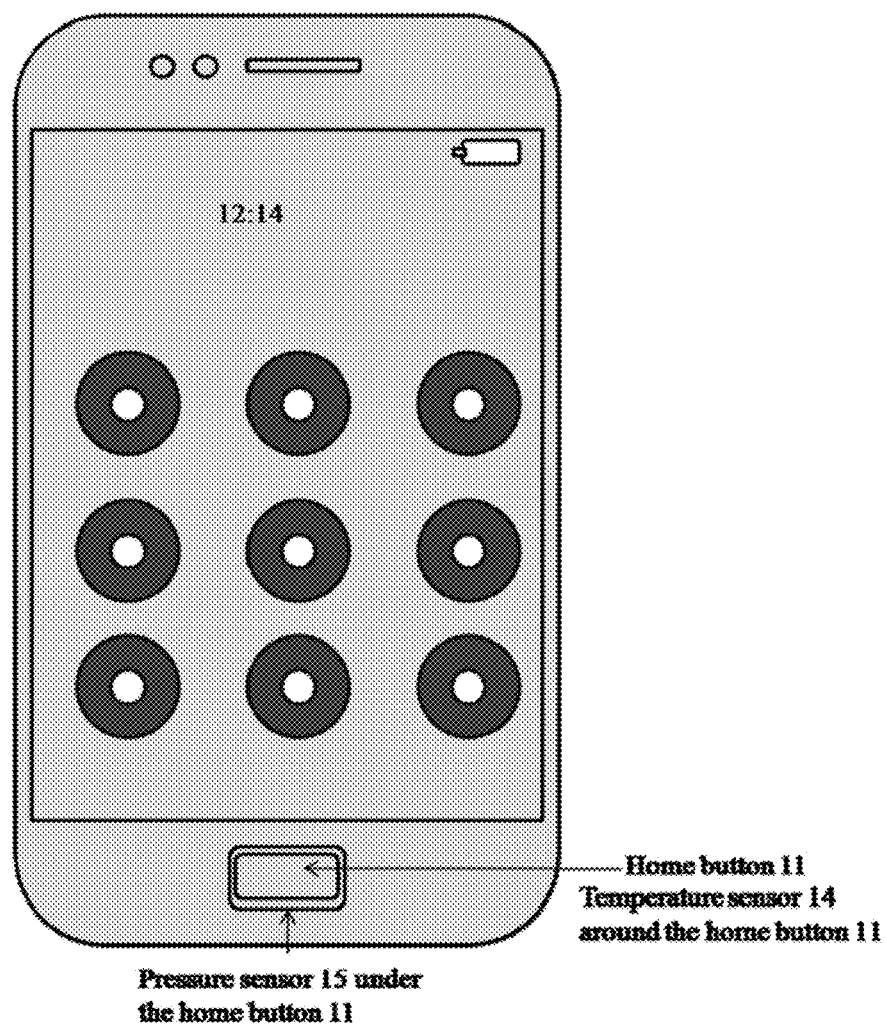
FIG. 2 is a diagrammatic view of an example embodiment of a home button of the electronic device.

In at least one embodiment, the home button 11 can be a physical button, or a virtual button. The temperature sensor 14 can be a contact temperature sensor, and include thermocouples and thermistors that measure a temperature. The pressure sensor 15 can measure pressure. The temperature sensor 14 can be installed around the home button 11, and the pressure sensor 15 can be installed under the home button 11 as shown in FIG. 2.

In at least one embodiment, the storage device 12 can include various types of non-transitory computer-readable storage mediums. For example, the storage device 12 can be an internal storage system, such as a flash memory, a random access memory (RAM) for temporary storage of information, and/or a read-only memory (ROM) for permanent storage of information. The storage device 12 can also be an external storage system, such as a hard disk, a storage card, or a data storage medium. The at least one processor 13 can be a central processing unit (CPU), a microprocessor, or other data processor chip that performs functions of the electronic device 1.

The working state changing system 10 can change a working state of the electronic device 1 to save power, according to data from the at least one sensor.

Figure 3:
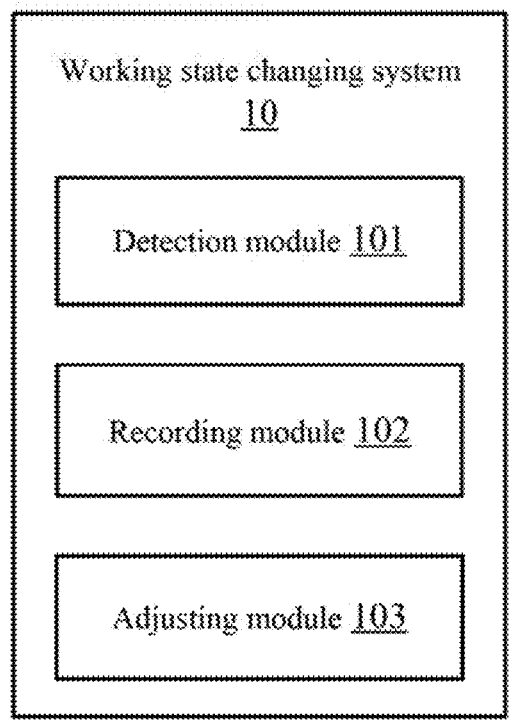
FIG. 3 is a block diagram of an example embodiment of function modules of a working state changing system in an electronic device.

FIG. 3 is a block diagram of one embodiment of function modules of the working state changing system. In at least one embodiment, the working state changing system 10 can include a detection module 101, a recording module 102, and an adjusting module 103. The function modules 101, 102, and 103 can include computerized codes in the form of one or more programs which are stored in the storage device 12. The at least one processor 13 executes the computerized codes to provide functions of the function modules 101-103.

The detection module 101 detects data from the sensor, in event the home button 11 is pressed. In at least one embodiment, the detected data includes a temperature data and a pressure data. As mentioned above, the at least one sensor includes the temperature sensor 14, and the pressure sensor 15. When the home button 11 is pressed by a user, the temperature of the touch of a finger can be measured by the temperature sensor 14, and the pressure of the fingertip can be measured by the pressure sensor 15.

The recording module 102 records a duration of pressing the home button in event the detected data is within a predetermined value. In at least one embodiment, when the temperature data is equal to or greater than a first predetermined value, such as 35 degrees Celsius, and the pressure data is within a second predetermined value range, it can be determined that the home button 11 is deliberately touched by a user, and the recording module 102 records a duration of pressing the home button 11. When the temperature data is less than the first predetermined value or the pressure data is outside of the second predetermined value range, it can be determined that the home button 11 is accidentally touched, there is no need to record a duration of pressing the home button 11.

The detection module 101 detects a current state of the electronic device 1. In at least one embodiment, states of the electronic device 1 may include the electronic device 1 being powered on, the electronic device 1 being powered off, the display screen of the electronic device 1 being active, and the display screen of the electronic device 1 being in a sleep state.

The adjusting module 103 changes the current state of the electronic device 1 according to the recorded duration. In at least one embodiment, the recorded duration is corresponding to at least one predetermined duration ranges, the at least one predetermined duration ranges includes a first duration range and a second duration range. In at least one embodiment, a minimum value of the first duration range is greater than a maximum value of the second duration range.

In one embodiment, when the recorded duration is within the first duration range and the current state of the electronic device is powered off, the adjusting module 103 powers on the electronic device 1. In one embodiment, when the recorded duration is within the first duration range and the current state of the electronic device is powered on, the adjusting module 103 powers off or restarts the electronic device 1. In one embodiment, when the recorded duration is within the second duration range and the current state of the electronic device 1 is powered on and the display screen is in a sleep state, the adjusting module 103 activates the display screen of the electronic device 1. In another embodiment, when the recorded duration is within the second duration range and the current state of the electronic device 1 is powered on and the display screen is in a working state, the adjusting module 103 deactivates the display screen of the electronic device 1 so it enters a sleep state.

Figure 4:
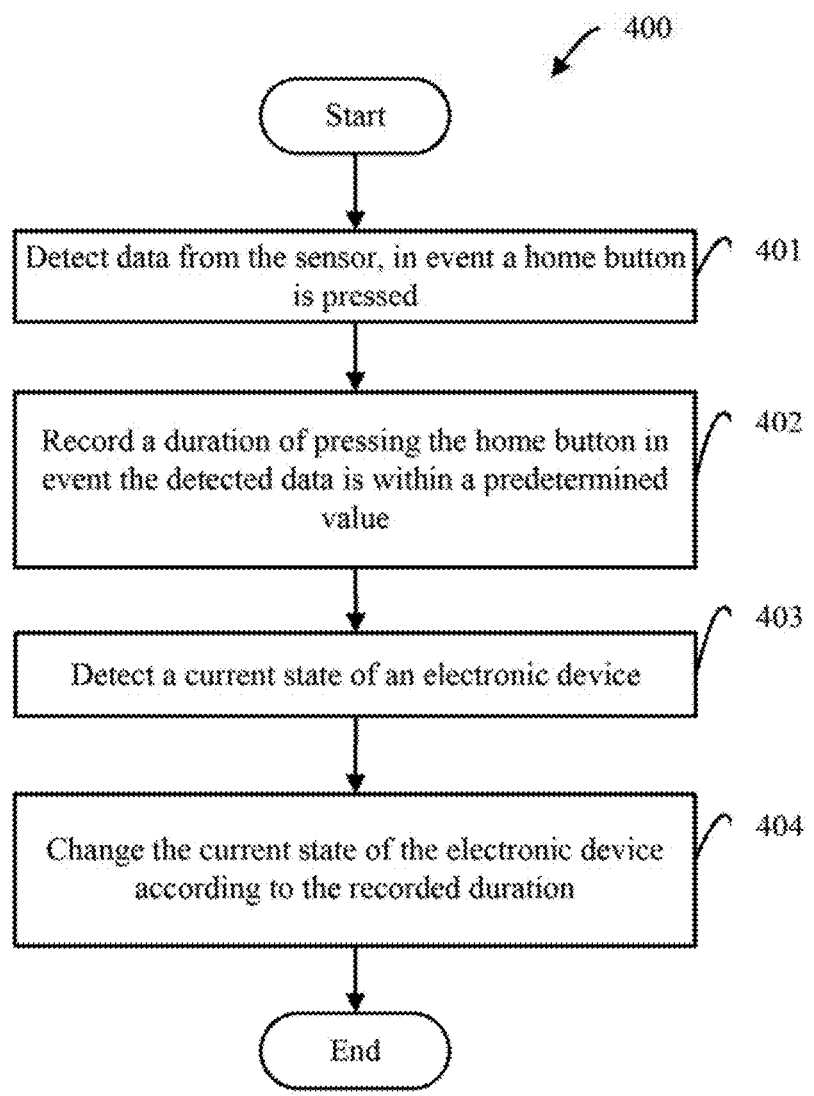
FIG. 4 is a flowchart of an example embodiment of a working state changing method using an electronic device.

FIG. 4 illustrates a flowchart is presented in accordance with an example embodiment. An example method 400 is provided by way of example, as there are a variety of ways to carry out the method. The example method 400 described below can be carried out using the configurations illustrated in FIG. 1 and FIG. 3, and various elements of these figures are referenced in explaining the example method. Each block shown in FIG. 4 represents one or more processes, methods, or subroutines, carried out in the example method 400. Furthermore, the illustrated order of blocks is illustrative only and the order of the blocks can be changed. The example method 400 can begin at block 401. Depending on the embodiment, additional blocks can be utilized and the ordering of the blocks can be changed.

At block 401, a detection module detects data from the sensor, in event the home button 11 is pressed. In at least one embodiment, the detected data from the sensor includes a temperature data and a pressure data. As mentioned above, the sensor includes a temperature sensor and a pressure sensor. The temperature sensor is installed around the home button, and the pressure sensor is installed under the home button. When the home button is pressed by a user, the temperature data can be measured by the temperature sensor, and the pressure data can be measured by the pressure sensor.

At block 402, a recording module records a duration of pressing the home button in event the detected data is within a predetermined value. In at least one embodiment, when the temperature data is equal to or greater than a first predetermined value, such as 35 degrees Celsius, and the pressure data is within a second predetermined value range, it can be determined that the home button is deliberately touched by a user, and the recording module records a duration of pressing the home button. When the temperature data is less than the first predetermined value or the pressure data is outside of the second predetermined value range, it can be determined that the home button is accidentally touched, there is no need to record a duration of pressing the home button.

At block 403, the detection module detects a current state of the electronic device. In at least one embodiment, states of the electronic device may include the electronic device being powered on, the electronic device 1 being powered off, the display screen of the electronic device being active, and the display screen of the electronic device being in a sleep state.

At block 404, an adjusting module changes the current state of the electronic device according to the recorded duration. In at least one embodiment, the recorded duration is corresponding to at least one predetermined duration ranges, the at least one predetermined duration ranges includes a first duration range and a second duration range. In at least one embodiment, a minimum value of the first duration range is greater than a maximum value of the second duration range.

In one embodiment, when the recorded duration is within the first duration range and the current state of the electronic device is powered off, the adjusting module powers on the electronic device. In one embodiment, when the recorded duration is within the first duration range and the current state of the electronic device is powered on, the adjusting module powers off or restarts the electronic device. In one embodiment, when the recorded duration is within the second duration range and the current state of the electronic device is powered on and the display screen is in a sleep state, the adjusting module activates and illuminates the display screen of the electronic device. In another embodiment, when the recorded duration is within the second duration range and the current state of the electronic device is powered on and the display screen is in a working state, the adjusting module deactivates the display screen of the electronic device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
   a home button;

at least one sensor;
at least one processor coupled to the sensor and the home button; and
a storage device storing one or more programs executable by the at least one processor to cause the at least one processor to:
detect data from the sensor in event the home button is pressed;
record a duration of pressing the home button in event the detected data is within a predetermined value;
detect a current state of the electronic device; and
change the current state of the electronic device according to the recorded duration, wherein the current state of the electronic device is changed by:
powering on the electronic device when the recorded duration is within a first duration range and the current state of the electronic device is powered off;
powering off or restarting the electronic device when the recorded duration is within the first duration range and the current state of the electronic device is powered on;
activating a display screen of the electronic device to enter a working state when the recorded duration is within a second duration range and the current state of the electronic device is powered on and the display screen is in a sleep state; and
deactivating the display screen of the electronic device to enter a sleep state when the recorded duration is within the second duration range and the current state of the electronic device is powered on and the display screen is in a working state.

2. The electronic device according to claim 1, wherein a minimum value of the first duration range is greater than a maximum value of the second duration range.

3. The electronic device according to claim 1, wherein the at least one sensor comprises a temperature sensor and a pressure sensor.

4. The electronic device according to claim 3, wherein the temperature sensor is installed around the home button, and the pressure sensor is installed under the home button.

5. The electronic device according to claim 1, wherein the detected data comprises a temperature data and a pressure data.

6. The electronic device according to claim 5, wherein the detected data is within a predetermined value comprises the temperature data is equal to or greater than a first predetermined value, and the pressure data is within a second predetermined value range.

7. A computer-implemented method for changing a working state of an electronic device being executed by at least one processor of the electronic device, the electronic device comprises a home button, and at least one sensor, the method comprising:
detecting data from the sensor in event the home button is pressed;
recording a duration of pressing the home button in event the detected data is within a predetermined value;
detecting a current state of the electronic device; and
changing the current state of the electronic device according to the recorded duration, wherein the current state of the electronic device is changed by:
powering on the electronic device when the recorded duration is within a first duration range and the current state of the electronic device is powered off; or
powering off or restarting the electronic device when the recorded duration is within the first duration range and the current state of the electronic device is powered on;
activating a display screen of the electronic device to enter a working state when the recorded duration is within a second duration range and the current state of the electronic device is powered on and the display screen is in a sleep state; or
deactivating the display screen of the electronic device to enter a sleep state when the recorded duration is within the second duration range and the current state of the electronic device is powered on and the display screen is in a working state.

8. The method according to claim 7, wherein a minimum value of the first duration range is greater than a maximum value of the second duration range.

9. The method according to claim 7, wherein the at least one sensor comprises a temperature sensor and a pressure sensor.

10. The method according to claim 9, wherein the temperature sensor is installed around the home button and the pressure sensor is installed under the home button.

11. The method according to claim 7, wherein the detected data comprises a temperature data and a pressure data.

12. The method according to claim 11, wherein the detected data is within a predetermined value comprises the temperature data is equal to or greater than a first predetermined value, and the pressure data is within a second predetermined value range.

13. A non-transitory storage medium having stored thereon instructions that, when executed by a processor of an electronic device, causes the processor to perform a method for changing a working state of the electronic device, the electronic device comprises a home button, and at least one sensor, the method comprising:
detecting data from the sensor in event the home button is pressed;
recording a duration of pressing the home button in event the detected data is within a predetermined value;
detecting a current state of the electronic device; and
changing the current state of the electronic device according to the recorded duration, wherein the current state of the electronic device is changed by:
powering on the electronic device when the recorded duration is within a first duration range and the current state of the electronic device is powered off; or
powering off or restarting the electronic device when the recorded duration is within the first duration range and the current state of the electronic device is powered on;
activating a display screen of the electronic device to enter a working state when the recorded duration is within a second duration range and the current state of the electronic device is powered on and the display screen is in a sleep state; or
deactivating the display screen of the electronic device to enter a sleep state when the recorded duration is within the second duration range and the current state of the electronic device is powered on and the display screen is in a working state.

14. The non-transitory storage medium according to claim 13, wherein a minimum value of the first duration range is greater than a maximum value of the second duration range.

15. The non-transitory storage medium according to claim 13, wherein the at least one sensor comprises a temperature sensor and a pressure sensor.

16. The non-transitory storage medium according to claim 15, wherein the temperature sensor is installed around the home button, and the pressure sensor is installed under the home button.

17. The non-transitory storage medium according to claim 13, wherein the detected data comprises a temperature data and a pressure data.

* * * * *